United States Patent
Hunt et al.

(10) Patent No.: US 8,141,151 B2
(45) Date of Patent: Mar. 20, 2012

(54) NON-INTRUSIVE MONITORING OF SERVICES IN A SERVICE-ORIENTED ARCHITECTURE

(75) Inventors: Christian Lee Hunt, Cary, NC (US);
Roger Michael Meli, Raleigh, NC (US);
Denilson Nastacio, Apex, NC (US);
Balan Subramanian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/847,846

(22) Filed: Aug. 30, 2007

(65) Prior Publication Data
US 2009/0064324 A1 Mar. 5, 2009

(51) Int. Cl.
*G06F 11/00* (2006.01)
*G06F 15/173* (2006.01)

(52) U.S. Cl. .................................. 726/22; 709/223
(58) Field of Classification Search .............. 726/22; 709/223
See application file for complete search history.

(56) References Cited

U.S. PATENT DOCUMENTS

| | | | |
|---|---|---|---|
| 6,363,411 B1 * | 3/2002 | Dugan et al. ............ | 709/202 |
| 6,816,886 B2 * | 11/2004 | Elvanoglu et al. ......... | 709/206 |
| 7,289,964 B1 * | 10/2007 | Bowman-Amuah ........ | 705/1.1 |
| 2003/0177264 A1 * | 9/2003 | Elvanoglu et al. ........ | 709/243 |
| 2004/0002958 A1 * | 1/2004 | Seshadri et al. ............ | 707/3 |
| 2004/0083281 A1 * | 4/2004 | Makagon et al. ......... | 709/223 |
| 2004/0111506 A1 * | 6/2004 | Kundu et al. ............. | 709/223 |
| 2005/0226193 A1 * | 10/2005 | Karhiniemi et al. ....... | 370/338 |
| 2005/0273516 A1 * | 12/2005 | Patrick et al. ............ | 709/238 |
| 2005/0273517 A1 * | 12/2005 | Patrick et al. ............ | 709/238 |
| 2006/0008069 A1 * | 1/2006 | Deo et al. ............. | 379/221.06 |
| 2006/0069717 A1 * | 3/2006 | Mamou et al. ........... | 709/203 |
| 2007/0283001 A1 * | 12/2007 | Spiess et al. ............. | 709/224 |
| 2007/0286198 A1 * | 12/2007 | Muirhead et al. ......... | 370/392 |
| 2008/0306798 A1 * | 12/2008 | Anke et al. ............... | 705/8 |
| 2009/0006897 A1 * | 1/2009 | Sarsfield ................. | 714/38 |
| 2010/0161362 A1 * | 6/2010 | Shapira et al. ............ | 705/7 |

* cited by examiner

*Primary Examiner* — Techane Gergiso
(74) *Attorney, Agent, or Firm* — Moore & Van Allen PLLC; Charles L. Moore

(57) ABSTRACT

A method for monitoring a service provided in a service-oriented architecture may include submitting a subscription request to a plurality of intermediaries in the service-oriented architecture from which to receive monitored data related to the service and determining which ones of the plurality of intermediaries to rely upon for monitoring the service. The method may also include receiving the monitored data from the determined ones of the plurality of intermediaries and presenting the monitored data for monitoring the service.

20 Claims, 4 Drawing Sheets

NON-INTRUSIVE MONITORING OF SERVICES IN A SERVICE-ORIENTED ARCHITECTURE

BACKGROUND OF THE INVENTION

The present invention relates to providing services, such as business transactions, e-commerce or other services, over a network, such as the Internet or other network, and more particularly to non-intrusive monitoring of services in a services-oriented architecture (SOA) or similar system.

Increasingly, services, such as business transactions, e-commerce, banking and other services are being provided over a system that may include a network, such as the Internet or other private or dedicated network. Such systems may include multiple resources, for example, servers, computer systems, databases or other resources for providing different services. The multiple resources and network may define a service-oriented architecture (SOA). In addition to e-commerce, other examples of a SOA may include different departments within an organization, such as billing, procurement, credit card check, insurance calculation or other services or resources that may be provided electronically over a network. An application can be put together including different services being available, such as those described above. Additionally, the respective services can be parts of different applications.

In a SOA environment, the responsibility, burden, or need for monitoring the services or resources and events from the resources may fall on the consumers of the services rather than the providers of the services. A service may be monitored by instrumentation of the service or application of agents or software modules deployed to monitor particular aspects of the service or particular resources used by the service. Instrumentation of a service in a SOA may prove difficult for a number of different reasons. Use of agents is intrusive on the service. Instrumentation of different services in a consistent manner to provide consistent behavior can be challenging. The administrative overhead associated with servicing management related queries and methods from multiple management consumers can have an effect on the operational performance of the service. Additionally, a service may participate in multiple composite applications. Management behavior associated with each of these composite applications may place an overhead burden on the service.

Known systems or products claiming to provide monitoring of SOA services rely on agents that monitor these services individually and provide relevant data to a management application. However, these systems do not consider the above challenges nor do they provide solutions for the same. The focus of these products has largely been on controlled, substantially static environments where service invocations and invocation paths are highly deterministic. While SOA services haven't widely gotten to the point of being very complex and dynamic, such a complex scenario may not be very far in the future. Additionally, while the agents of these known systems or products provide service level metrics they do not provide resource level metrics without being intrusive on the service end. While intelligent Level 3 routers or the like are available, they do not provide routing or intelligence specific to the domain of resource monitoring, event management and problem determination.

BRIEF SUMMARY OF THE INVENTION

In accordance with an embodiment of the present invention, a method for monitoring a service provided in a service-oriented architecture may include submitting a subscription request to a plurality of intermediaries in the service-oriented architecture from which to receive monitored data related to the service and determining which ones of the plurality of intermediaries to rely upon for monitoring the service. The method may also include receiving the monitored data from the determined ones of the plurality of intermediaries and presenting the monitored data for monitoring the service.

In accordance with another embodiment of the present invention, a method for monitoring a service provided in a service-oriented architecture may include receiving a subscription request to monitor and provide monitored data related to the service. The method may also include determining whether any messages related to the service have been previously processed; declining the subscription request in response to not having previously processed any messages related to the service; or accepting the subscription request in response to having previously processed a predetermined number of messages related to the service. The method may additionally include returning a probability to a subscriber in response to accepting the subscription request. The probability may be a function of at least a frequency of messages associated with the service having been previously processed and a time period since a last message associated with the service was processed. The method may further include publishing any monitored data to any subscriber for which the subscription request has been accepted.

In accordance with another embodiment of the present invention, a method for monitoring a service in a service-oriented architecture may include inspecting each message header for any performance and management data corresponding to a subscription request to monitor performance and management data related to the service. The method may also include identifying each message header in response to the message header including any performance and management data corresponding to the subscription request. The method may further include adding all identified message headers to a response before sending to a consumer of the service.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
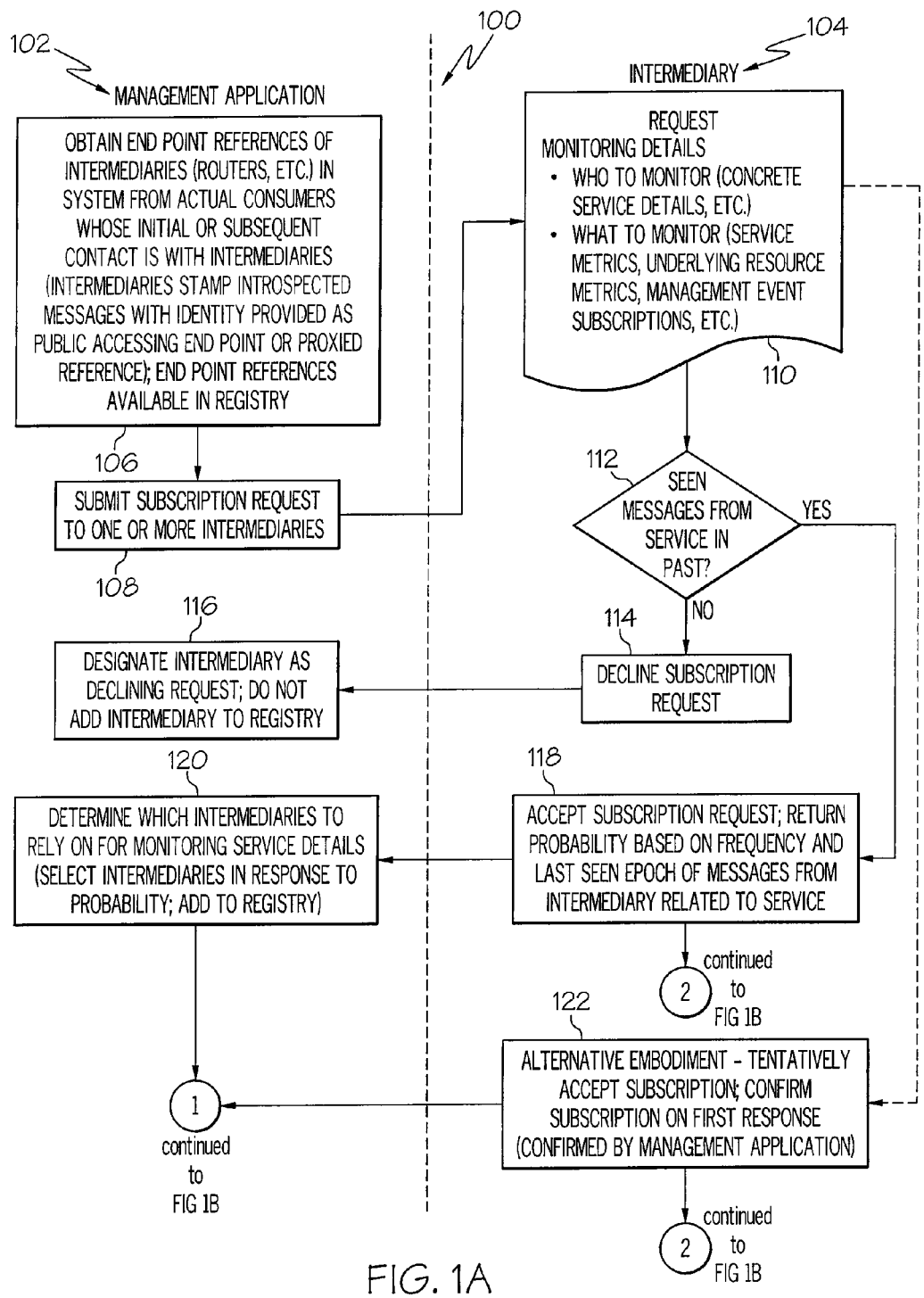
FIGS. 1A and 1B (collectively FIG. 1) are a flow chart of an exemplary method for non-intrusive monitoring of services in a SOA in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, such as for example medium 320 in FIG. 3, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Service Modeling Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
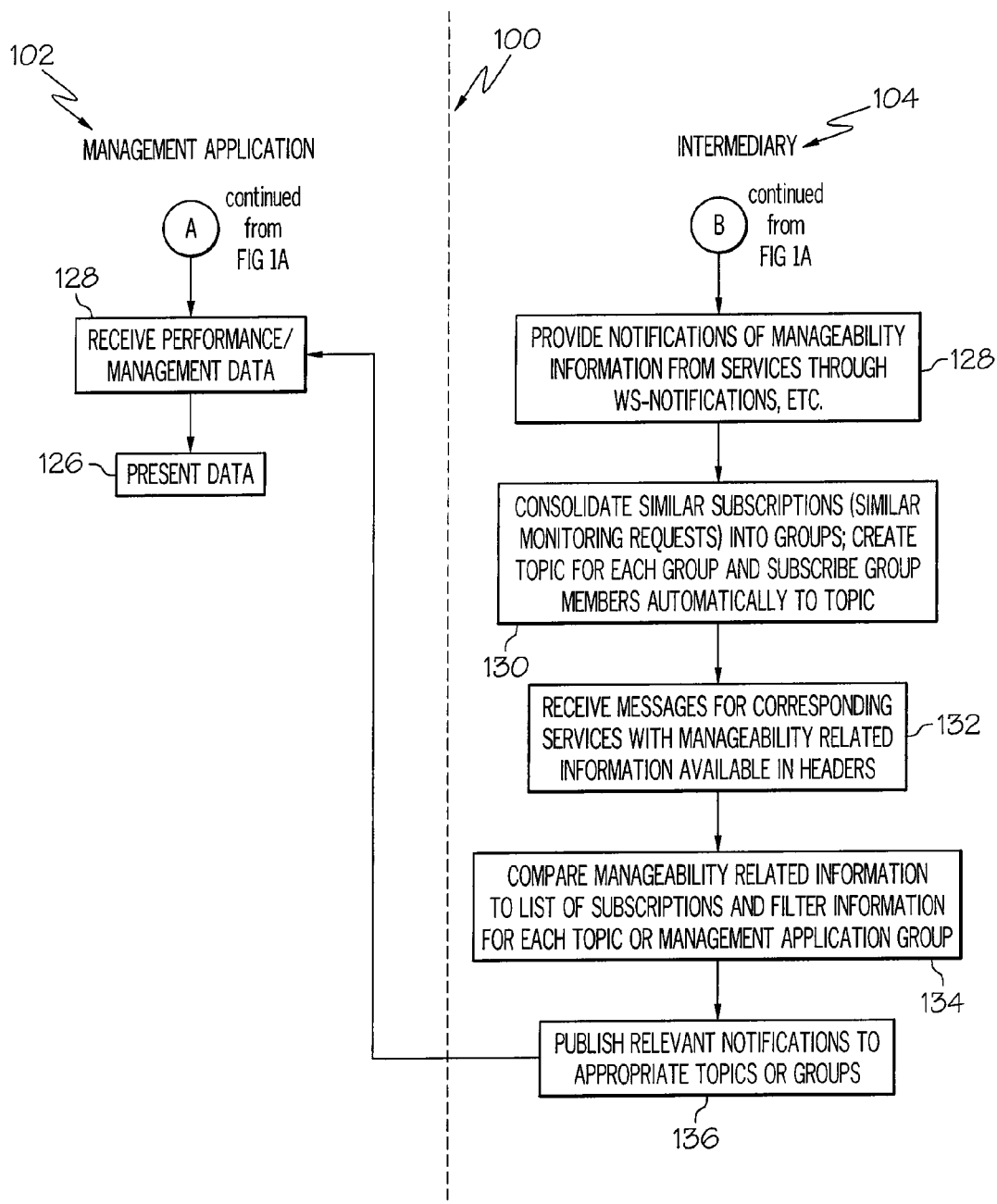

FIGS. 1A and 1B (collectively FIG. 1) are a flow chart of an exemplary method 100 for non-intrusive monitoring of services in a SOA or other type system in accordance with an embodiment of the present invention. The method 100 may be divided into functions or operations that may be performed by a management application 102 and functions or operations that may be performed by an intermediary 104 in the SOA or system. The management application 102 may be operable on a computing device, processor or other hardware as described with reference to FIG. 3. The intermediary 104 may be a Simple Object Access Protocol (SOAP) intermediary, as described in more detail with reference to FIG. 3, resource, server, router, database or other component in the SOA or system and capable of performing the operations described herein to provide a service to a service consumer and monitor and manage the service.

In block 106, end point references of each of the intermediaries 104 in the SOA or system may be obtained by the management application 102. An end point reference may be defined as an identification and location or address of the intermediary 104 in the system or on a network. The end point references may be obtained by the management application 102 in various ways. In one embodiment, the management application 104 may receive the endpoint references of the intermediaries 104 from the from actual service consumers who have initial or subsequent contact with the respective intermediaries. This is because, in an embodiment of the present invention, the SOAP messages that ultimately reach the service consumer pass through these intermediaries 104. Each intermediary 104 adds its respective endpoint reference to the message to indicate that it has processed that message. The intermediaries 104 stamp introspected messages with their identity physically manifested as a publicly accessible end point or proxied reference. In another embodiment of the present invention, the endpoint references of the intermediaries 104 may be available in a single publicly known registry.

In block 108, a subscription request 110 may be submitted to one or more intermediaries 104. The subscription request 110 may include monitoring details, such as whom and what to monitor, as well as other parameters that may be useful in monitoring and managing a particular service. Examples of who to monitor may include concrete service details and the like. Examples of concrete service details may include service name, endpoint reference, type of service, or any other details related to the particular service. Typically a single detail may be monitored by an intermediary and not a combination of different details.

Examples of what to monitor may include service metrics, underlying resource metrics, management event subscriptions and other details. Additional examples may include number of requests processed, average response time for requests, standard deviation in response time for service metrics; central processing unit (CPU) usage, memory usage, etc. for resource metrics; CPU usage above a predetermined threshold, critical failure and recovery events for management event subscriptions and the like.

In block 112, the intermediary 104 may determine if any messages from the service or service provider have been previously seen or processed by the intermediary 104. If no messages from the service or service provider have previously been processed by the intermediary 104, the subscription request 110 may be declined in block 114 and the management application 102 may be notified as such. In block 116, the management application 102 may designate the intermediary 104 as declining the subscription request. As a result, this particular intermediary will not be added to a registry of intermediaries that will be relied on for monitoring and managing the service.

If the intermediary 104 has previously seen or processed messages from the service, the method 100 may advance to block 118. In block 118, the subscription request may be accepted in response to the intermediary 104 having previously processed messages from the service or service provider. The intermediary 104 may return a probability to the management application 102. The probability is a indicator of the future reliability of the intermediary 104 in providing data, such as management and performance data related to the service or service provider. In other words, how likely is the intermediary expected to process messages related to the service or from the service provider in the future? How often or with what frequency is the intermediary expected to process messages related to the service? The probability may also take into account other reliability parameters. The probability returned to the management application 102 may be a function of at least a frequency of messages associated with the service previously processed by the intermediary, a time period since a last message associated with the service was processed by the intermediary, and any other parameters that may be helpful in generating a probability value that the intermediary will process messages associated with the service or service provider in the future and will be able to provide reliable management and performance data related to the service or service provider.

In block 120, which intermediaries 104 to be relied upon for monitoring service details or metrics may be determined. The intermediaries 104 may be determined by selecting intermediaries based on their respective returned probability. Any selected intermediaries 104 may be added to the registry of intermediaries. The registry may include an identity of each selected intermediary, a location or address on the system or network and any other parameters that may be useful for monitoring the performance of the service.

In an alternate embodiment of the present invention, in block 122, after the subscription request is received by the intermediary 104, the intermediary 104 may tentatively accept the subscription. The subscription may then be confirmed on a first response to a query or request for management and performance data by the management application 102 or a service consumer. The subscription may be confirmed by the management application 102 after the first response to a request or query is received from the particular intermediary 104.

In block 124, the management application 102 may receive the management and performance data in response to a request or the data may be published by the intermediary to any subscribers (subscribing management application) as further described herein. In block 126, the data may be presented by an output device, for example, displayed on a monitored and/or printed by a printer.

In block 128, any notifications of manageability information from the service or services may be provided by the intermediaries 104 through Web Services-Notification or a similar protocol.

In block 130, similar subscriptions or similar monitoring requests may be consolidated by the intermediary 104 into groups or management application groups. Each group may correspond to similar data being monitored according to each subscription request. A topic may be created for each group. The topic may correspond to common data or metrics to be monitored and published. Group members may be automatically subscribed according to the topic and the details of their respective monitoring requests or subscription requests.

In block 132, the intermediary 104 may receive messages corresponding to the services being monitored and which include data being monitored and/or manageability related information in the message headers. An exemplary process or method that may be performed in the intermediary 104 will be described in more detail with reference to FIG. 2.

In block 134, manageability and performance related information or data being monitored may be compared to the list of subscriptions or different topics for each group. The information may be filtered for each topic or management application group. In block 136, relevant notifications may be published to each appropriate topic or group. The performance and management data may then be requested or published to the management application in block 124 and presented in block 126 similar to that previously described.

Figure 2:
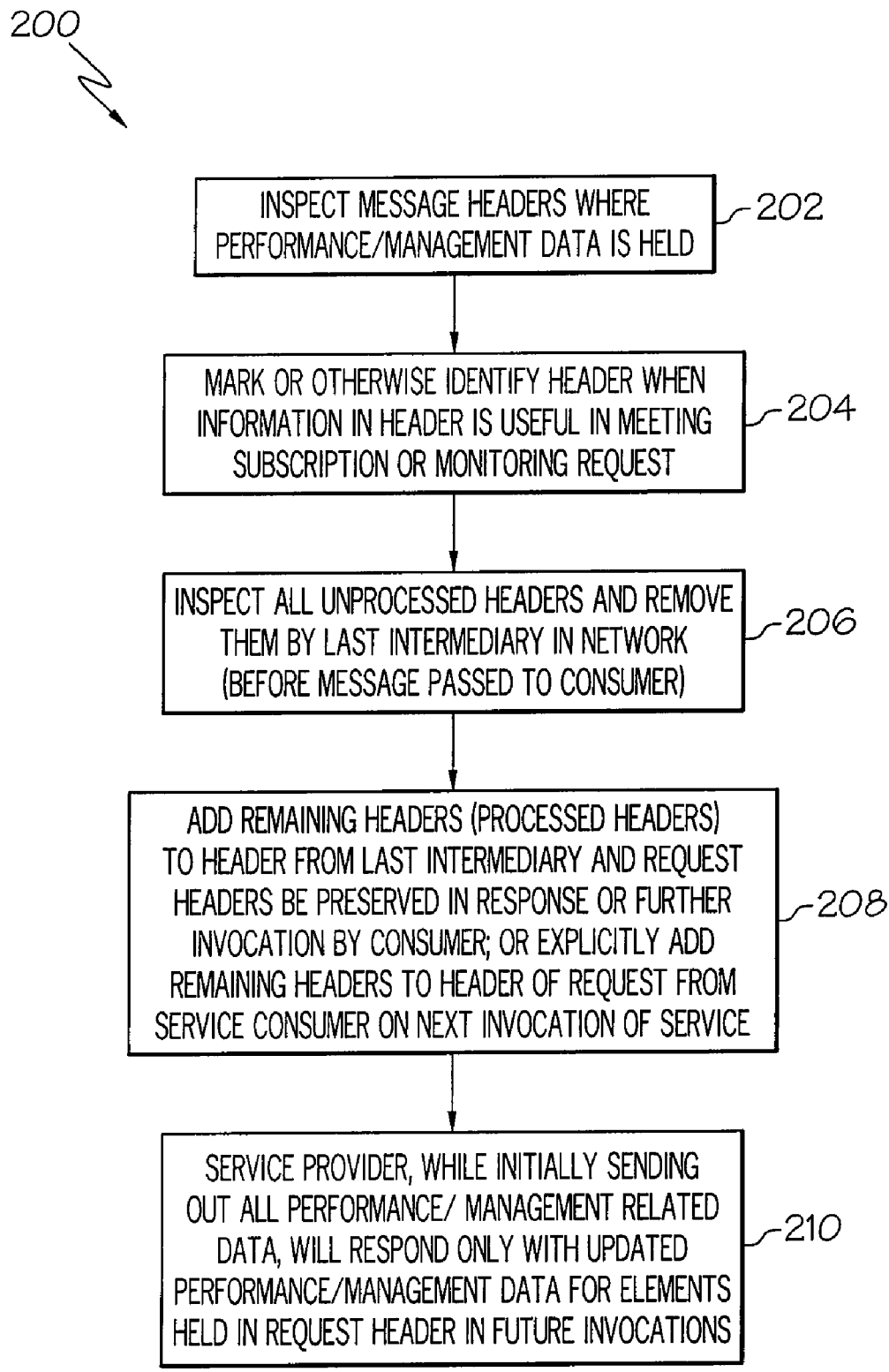
FIG. 2 is a flow chart of an example of a method for non-intrusive monitoring services in a SOA in accordance with another embodiment of the present invention.

FIG. 2 is a flow chart of an example of a method 200 for non-intrusive monitoring services in a SOA in accordance with another embodiment of the present invention. The method 200 may be embodied in and performed by an intermediary. In block 202, a message header may be inspected. The message header may include performance and management data for monitoring and managing a service associated with the message.

In block 204, the message header may be marked or otherwise identified if information in the message header is useful in meeting or satisfying any subscription or monitoring requests. A marked or identified header may be referred to as a processed header.

In block 206, all unprocessed headers or headers that are not marked or identified may be inspected. All unprocessed headers may be removed by the last intermediary in a network. The last intermediary in the network or system may be the last intermediary before the message is passed to the service consumer.

In block 208, any remaining headers which will include all marked or identified headers (processed headers) may be added to the message header from the last intermediary. The intermediary may also request in the message or header that all of the processed headers be preserved in any response for further invocation of the service by the consumer. In an alternative embodiment, the remaining or processed headers may be explicitly added to the header of a request from the service consumer on the next invocation of the service.

In block 210, the service provider may initially send out all performance and management related data. In any subsequent invocation of the service, the service provider may only respond with updated performance and management data corresponding to the elements or parameters in a request header.

Figure 3:
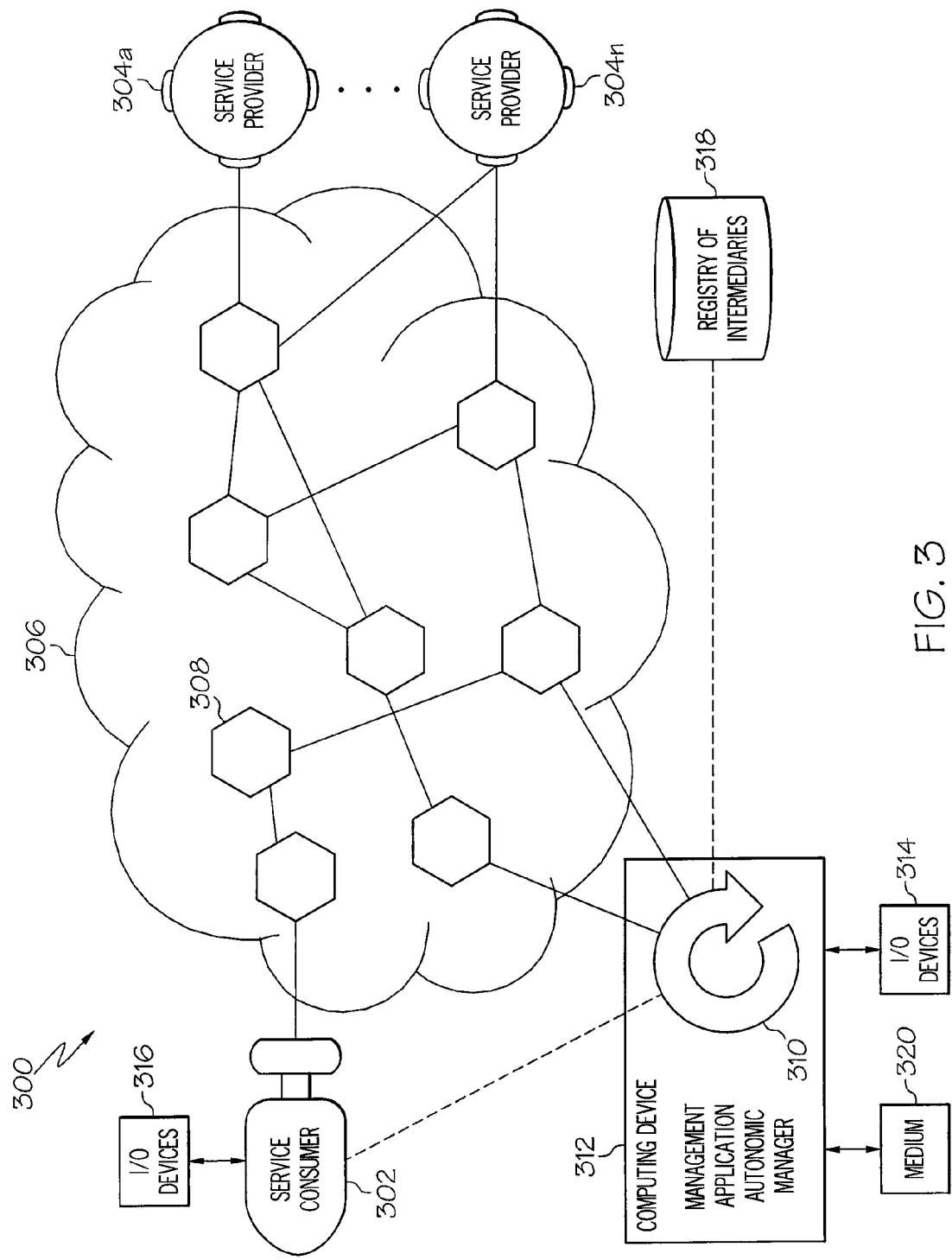
FIG. 3 is a block diagram of an example of a system for non-intrusive monitoring of services in a SOA in accordance with an embodiment of the present invention.

FIG. 3 is a block diagram of an example of a system or SOA 300 including features for non-intrusive monitoring of services in the SOA 300 in accordance with an embodiment of the present invention. The methods 100 and 200 may be embodied in and performed by the components of the system or SOA 300. One or more service consumers 302 may request services of various kinds from a plurality of service providers 304. As previously described, the services may include but are not limited to business transactions, retail sales, e-commerce, online banking, retrieval of information, different departments or services within an organization, or any other services that can be provided over a network 306, such as the Internet, intranet or other private or dedicated network.

A plurality of intermediaries 308 may be included to transfer messages or other information or data between the service provider 304 and the service consumer 302. The intermediaries 308 may also perform functions or operations associated with the service similar to that described herein.

A management application 310 operable on a computing device 312 or processor may submit subscription requests to the intermediaries or selected intermediaries and receive management and performance data from the intermediaries similar to that previously described. The management application may be an automatic manager or similar apparatus. An autonomic manager is simply an automated systems application that has the requisite knowledge and intelligence to automatically respond to changes in system state by invoking corrective operations on various components of the system. The autonomic manager may involve four phases or functions: monitor, analyze, plan and execute (MAPE) phases. Autonomic managers are described in more detail in "An Architectural Blueprint for Autonomic Computing" Third Edition, June 2005, available from the IBM Corporation.

Input and output devices 314 or combination I/O devices may be included to permit control of the management application 310 and to present any performance and management data to a user. Input and output devices 316 may also be associated with the service consumer 302.

A registry of intermediaries 318 may be included for recording or registering information related to any intermediaries 308 that are being relied upon for monitoring the services being provided by the service providers 304.

The intermediaries 308 may be Simple Object Access Protocol (SOAP) intermediaries or a similar type intermediary. SOAP intermediaries may be present in almost every SOA implementation. The SOAP intermediaries 308 may act as logical routing and aggregation points for service invocations. The intermediaries 308 may inspect headers of messages but not the actual message bodies. The intermediaries 308 may be implemented as a hardware appliance embedded within the physical network of the SOA 300. The SOAP intermediaries 308 together provide the routing network 306 at the application level. A SOAP intermediary may be similar to a router but at an application level. The SOAP intermediary 308 may look at the SOAP messages and know where to send the message next to get to a service. The SOAP intermediary does not look at packets but instead at the SOAP messages. The SOAP intermediaries may be instrumented in a generic fashion. In one embodiment of the present invention, the intermediaries 308 may collect and determine service level metrics but may not be able to determine resource level metrics.

In accordance with an embodiment of the present invention, the SOAP intermediaries 308 may act as brokers for monitoring information carried as part of the SOAP exchange in the SOA 300 or similar system. The SOAP intermediaries 308 may allow a registration of interest from a consumer side management system, such as management application 310 or similar systems. The registration of interest or subscription may be for particular properties and events associated with services and underlying resources of the SOA 300 which may be exposed for management.

The intermediaries 308 in addition to brokering, may provide resource intensive value added services or functions, such as statistical data gathering, event conversions, catalog lookups, data aggregation and mining. The service or service providers 304 may not be able to provide such functions because such administrative functions or tasks may not be able to be handled in a scalable fashion by the services or service providers 304 whose primary task is to respond to operational requests from service consumers like service consumer 302.

As described above, the embodiments of the present invention allow non-intrusive monitoring of services by reusing the routing paths or infrastructure that has already been laid out for service delivery. The system 300 separates the management application 310 for monitoring the service from the actual services 304 being monitored and/or managed by adding intelligence or functionality in the intermediaries 308, in the middle, between the management application 310 and the services or service providers 304. This arrangement places the least burden on the management application 310 and the services or service providers 304.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for monitoring a service provided in a service-oriented architecture, comprising:
submitting, by a computing device, a subscription request to a plurality of intermediaries in the service-oriented architecture from which to receive monitored data related to the service;
determining, by the computing device, which ones of the plurality of intermediaries to rely upon for monitoring the service based at least in part on a probability value associated with each of the plurality of intermediaries in response to the subscription request, wherein the probability value is a function of at least a frequency of messages associated with the service processed by the intermediary associated with the probability value and a time period since a last message associated with the service was processed by the intermediary associated with the probability value;
receiving, by the computing device, the monitored data from the determined ones of the plurality of intermediaries; and
presenting, by the computing device, the monitored data for monitoring the service.

2. The method of claim 1, wherein determining which ones of the plurality of intermediaries to rely upon for monitoring the service comprises:
receiving the probability value from those intermediaries that return the probability value in response to the subscription request; and
selecting from those intermediaries returning the probability value based on the probability value.

3. The method of claim 1, further comprising adding each intermediary being relied upon for monitoring the service to a registry.

4. The method of claim 1, further comprising designating a particular intermediary as declining the subscription request in response to receiving a notice from the particular intermediary that the particular intermediary is declining the subscription request.

5. The method of claim 1, obtaining an end point reference of each of the plurality of intermediaries in the system.

6. The method of claim 5, wherein obtaining the end point reference of each of the plurality of intermediaries in the system comprises obtaining the end point reference of a particular intermediary from a consumer of the service that has had one of direct or indirect contact with the particular intermediary, wherein the intermediary stamps each message introspected with an identity provided as one of a public accessing point and a proxied reference.

7. A method for monitoring a service provided in a service-oriented architecture, comprising:
receiving, by an intermediary, a subscription request to monitor and provide monitored data related to the service, wherein the intermediary comprises a hardware appliance embedded within the service-oriented architecture;
determining, by the intermediary, whether any messages related to the service have been previously processed;
declining, by the intermediary, the subscription request in response to not having previously processed any messages related to the service;
accepting, by the intermediary, the subscription request in response to having previously processed a predetermined number of messages related to the service;
returning, by the intermediary, a probability to a subscriber in response to accepting the subscription request, wherein the probability is a function of at least a frequency of messages associated with the service having been previously processed and a time period since a last message associated with the service was processed; and
publishing, by the intermediary, any monitored data to any subscriber for which the subscription request has been accepted.

8. he method of claim 7, further comprising:
tentatively accepting the subscription request in response to receiving the subscription request; and
confirming acceptance of the subscription request in a first response including monitored data corresponding to the subscription request.

9. The method of claim 7, further comprising consolidating a plurality of subscriptions into different groups, wherein each group corresponds to similar data being monitored corresponding to each subscription request.

10. The method of claim 9, further comprising:
creating a topic for each group, wherein each topic corresponds to common data or metrics to be monitored and published; and
automatically subscribing group members according to the topic.

11. The method of claim 10, further comprising:
receiving messages corresponding to different services, each message including manageability related information in a header;
comparing manageability related information to a list of subscribers;
filtering the manageability related information for each group; and
publishing a relevant notification to each group according to the topic.

12. The method of claim 7, further comprising:
inspecting each message header for any data corresponding to the subscription request; and
identifying each message header in response to the message header including any data to satisfy the subscription request.

13. The method of claim 12, further comprising:
inspecting all message headers that have not been identified;
removing all message headers that have not been identified before passing the messages to a consumer of the service.

14. The method of claim 13, further comprising:
adding all identified message headers in a last intermediary in a network before sending to the consumer of the service; and
requesting that all identified message headers be preserved in any further invocations by the consumer.

15. The method of claim 13, further comprising adding all identified message headers to a header of any request from the consumer on a next invocation of the service.

16. A method for monitoring a service in a service-oriented architecture, comprising:
inspecting, by an intermediary, each message header for any performance and management data corresponding to a subscription request to monitor performance and management data related to the service, wherein the intermediary comprises a hardware appliance embedded within the service-oriented architecture;

identifying, by the intermediary, each message header that includes performance and management data corresponding to the subscription request; and adding, by the intermediary, all identified message headers to a response corresponding to the subscription request before sending to a consumer of the service.

17. The method of claim 16, further comprising:
adding all identified message headers in a last intermediary in a system before sending to the consumer of the service; and
requesting that all identified message headers be preserved in invocations of the service.

18. The method of claim 16, further comprising adding all identified message headers to a header of the request from the consumer on a next invocation of the service.

19. The method of claim 16, further comprising removing all message headers that have not been identified before sending the response to the consumer.

20. The method of claim 16, further comprising:
sending all performance and management related data in an initial invocation of the service; and
sending only updated performance and management data for elements in a request header after sending the initial invocation.

* * * * *